United States Patent [19]

Jacobi

[11] 4,260,304
[45] Apr. 7, 1981

[54] METHOD FOR MACHINING AN IMPELLER COVER

[75] Inventor: Helmuth O. Jacobi, Olean, N.Y.

[73] Assignee: Dresser Industries, Inc., Dallas, Tex.

[21] Appl. No.: 83,429

[22] Filed: Oct. 10, 1979

[51] Int. Cl.³ ............................................. B23C 3/32
[52] U.S. Cl. .................................... 409/132; 409/131
[58] Field of Search .................................. 409/131, 132

[56] References Cited

U.S. PATENT DOCUMENTS

| | | | |
|---|---|---|---|
| 3,212,405 | 10/1965 | Smith | 409/132 |
| 3,906,834 | 9/1975 | Gladwin | 409/132 |
| 4,028,992 | 6/1977 | Kuehnle | 409/132 |
| 4,031,805 | 6/1977 | Shraiman | 409/132 X |
| 4,198,182 | 4/1980 | Green | 409/132 |

Primary Examiner—William R. Briggs
Attorney, Agent, or Firm—Roy L. Van Winkle

[57] ABSTRACT

In a method of machining an upper conical surface in an annular impeller cover, a rotatable milling cutter has its cutting surface ground to an angle approximately equal to that of the desired conical surface configuration of the cover. The milling cutter is then caused to rotate and by the use of a three dimensional milling machine, the cutter is moved across the annular cover blank used for making the cover, cutting the conical surface and forming a plurality of integral vanes that project from the conical surface in circumferentially-spaced relationship.

3 Claims, 3 Drawing Figures

METHOD FOR MACHINING AN IMPELLER COVER

BACKGROUND OF THE INVENTION

This invention relates generally to an improved method of machining an upper conical surface on an annular impeller cover for centrifugal compressors or the like. More particularly, but not by way of limitation, this invention relates to an improved method of machining the upper conical surface on the annual impeller cover to form a plurality of spaced, integral vanes that project from the conical surface of the cover.

Various methods of manufacturing turbine blades or rotors are illustrated in U.S. Pat. No. 767,367 issued Aug. 9, 1904 to George Westinghouse; No. 1,744,757 issued Jan. 28, 1930 to Gale L. Ferguson; and No. 2,633,776 issued Apr. 7, 1953 to Jan M. Schenk. A further U.S. Pat. No. 2,429,324 issued to Christian Meisser, Oct. 21, 1947, illustrates the use of a three dimensional milling machine for manufacturing a rotor for centrifugal compressors. None of the foregoing patents illustrates the type of impeller cover manufactured in accordance with this invention, nor do any illustrate the method of manufacture that is utilized in constructing the impeller cover of this invention.

An object of this invention is to provide an improved method for machining a tapered impeller cover in which the cover can be manufactured very quickly and easily from an annular blank with integral vanes formed thereon.

SUMMARY OF THE INVENTION

This invention provides an improved method of machining an upper conical surface on an annular impeller cover providing a plurality of integral vanes projecting from the conical surface that includes the steps of: locating and holding an annular impeller cover blank on a machine surface; forming a cutting edge on a rotatable cutter to an angle relative to its rotational axis that is substantially equal to the desired taper angle of the cover; positioning the cutter edge adjacent to the blank impeller cover; feeding the cutter into the blank impeller cover while rotating the cover, the cutter being fed in a direction across the blank impeller substantially perpendicularly relative to the lowermost line of contact between the cutting edge and the blank impeller cover; and, repeating the feeding while skipping predesignated, circumferentially-spaced areas to form vanes on the impeller cover.

BRIEF DESCRIPTION OF THE DRAWING

The foregoing and additional objects and advantages of the invention will become more apparent as the following detailed description is read in conjunction with the accompanying drawing wherein like reference characters denote like parts in all views and wherein.

DETAILED DESCRIPTION OF THE PREFERRED EMBODIMENT

Figure 1:
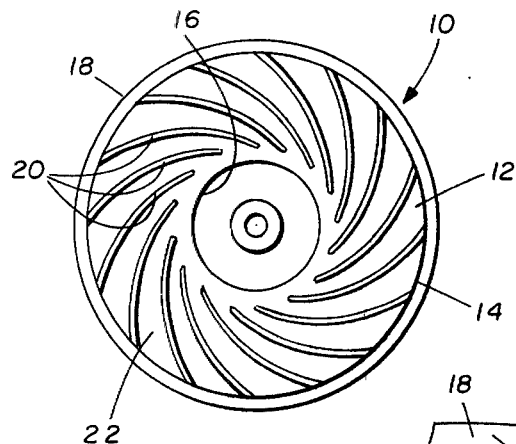
FIG. 1 is a plan view of an impeller machined in accordance with the invention.

Referring to the drawing and to FIG. 1 in particular, shown therein and generally designated by the reference character 10 is an impeller cover that has been manufactured by the method of this invention. The impeller cover 10 includes an annular disc 12 having an outer periphery 14 and an inner periphery 16. A flange 18 extends around the outer periphery 14 as may be more clearly seen on FIG. 3 for holding the disc 12 on the milling machine (not shown). A plurality of circumferentially-spaced curved vanes 20 project outwardly from a tapered or conical surface 22.

Figure 3:
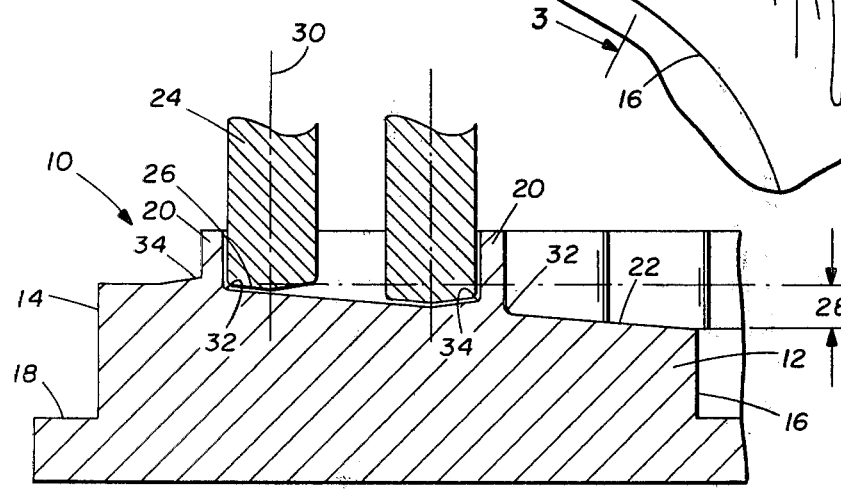
FIG. 3 is a cross-section taken generally along the line 3—3 of FIG. 2.

Referring to FIG. 3, the end of the milling cutter 24 has tapered cutting edges 26 formed theron. The tapered cutting edges 26 are formed generally parallel to the desired slope 28 of the conical surface 22. That is, the edges 26 are formed so that the angle between a perpendicular to the rotational axis 30 of the cutter 24 and the edge 26 is substantially equal to the slope 28.

As can be seen in FIG. 3, the cutter 24 cuts into corners 32 formed by the vanes 20 removing all material down to the desired conical surface. Each corner 34, on the other hand, has a small portion where the cutter edge 26, due to its configuration, cannot reach. However, such small portions are not of consequence in the finished impeller.

In the practice of the method of the invention, the cutter 24 is sharpened to provide the cutting edges 26 as described hereinbefore. After the annular disc 12 has been mounted on the milling machine table, the cutter 24 is positioned adjacent to the disc 12.

In the preferred method of the invention, the milling machine will be of the three dimensional type and will use a template (not shown) which directs the cutters as they traverse the work piece to be sure of an accurate reproduction of the template which has been constructed with great precision. As the follower is moved on the template, and with the cutter 24 rotating about the rotational axis 30, the cutter 24 is fed into the disc 12 along paths indicated by reference characters A, B, C and D on FIG. 2.

Figure 2:
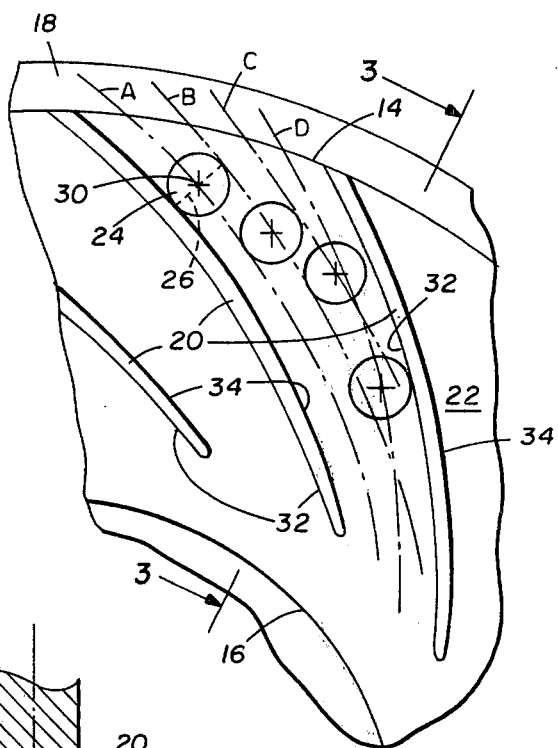
FIG. 2 is an enlarged portion of the impeller of FIG. 1 showing the machining method in more detail.

In FIG. 2, several cutters are indicated, but it will be understood that only one cutter is used and that the various cutters illustrated are utilized to indicate the paths of the cutter 24 as it traverses the disc 12. During such traverses, the cutting edge 26 of the cutter 24 is disposed approximately perpendicular with respect to the path of travel of the cutter through the disc 12.

Since the milling machine is of a three-dimensional type, the template will be constructed so that as the cutter 24 is fed across the disc 12 and is also fed downwardly with respect thereto forming the slope 28 as the cutter 24 progresses along the indicated paths. When the cuts have been completed, the cutter 24 will have reached the full depth and the disc 12 will be substantially as illustrated in FIG. 3. The method, when practiced in accordance with the invention, will quickly and easily produce the tapered or conical surface of the cover 10 with the integrally formed outstanding vanes 20 thereon.

In order to form the individual vanes 20, it will of course be understood that certain areas of the disc 12 are proscribed from cutting and such areas will be circumferentially-spaced as illustrated in FIG. 1 so that the finished impeller will have a multiplicity of a circumferentially-spaced and integrally formed vanes 20 thereon. When using a milling machine with the template, it is necessary to index or rotate the disc 12 in steps about its centerline. Upon indexing, the disc 12 is located so that a complete vane 20 can be formed.

Although not forming part of this invention, it will be understood that the disc 12 will after the conical surface of the impeller have been formed as previously described, be removed from the milling machine and the opposite surface thereof be formed in accordance with conventional practice. It will be understood that the particular configuration of cutter 24 utilized, that is, the configuration of the cutting edge 26, permits the removal of metal rapidly, quickly and easily to form the completed conical surface 20. It should also be understood that there are many variations or modifications and changes that can be made hereto without departing from the scope of the invention.

The embodiments of the invention in which an exclusive property or privilege is claimed are defined as follows:

1. In a method of machining a conical impeller cover, the steps of:
   forming the cutting edge of a rotatable cutter to an angle relative to its rotational axis that is substantially equal to the tapered angle of said cover;
   positioning said cutting edge adjacent to a blank impeller cover;
   feeding said cutter into said blank impeller cover while rotating said cutter, said cutter being fed in a direction across said blank impeller substantially perpendicularly relative to the lowermost line of contact between said cutting edge and blank impeller cover; and,
   repeating said feeding while skipping certain circumferentially-spaced areas to form vanes on said impeller cover projecting in a direction substantially parallel to the rotational axis of said cutter.

2. A method of machining an upper conical surface on an annular impeller cover to provide a plurality of integral vanes projecting from said conical surface including the steps of:
   forming a lower cutting edge on a rotatable cutter to an angle relative to its rotational axis that is substantially equal to the angle of the upper conical surface;
   locating and holding an annular impeller cover blank on a machine surface;
   positioning said cutter adjacent to said blank; feeding the rotating cutter into said blank in a direction substantially perpendicular to the lowermost line of contact between said cutting edge and blank; and,
   repeating said feeding step while skipping predesignated, circumferentially-spaced areas to form said vanes.

3. A method of machining an impeller cover including the steps of:
   forming a lower cutting edge on a rotatable cutter to an angle corresponding to the desired conical configuration of the finished surface of said cover;
   predesignating circumferentially-spaced areas on the surface of an annular cover blank for removal leaving other uncut areas to form integral vanes;
   locating and holding said blank on a machine surface;
   moving and rotating said cutter in a direction in said predesignated areas from the outer periphery of said blank toward its inner periphery while simultaneously moving said cutter parallel to its rotational axis whereby said surface slant from the outer periphery of said blank causing said machine cover to be of less thickness at its inner periphery;
   indexing said blank about its axis; and,
   repeating the step of moving and rotating said cutter until said blank is formed into said cover.

* * * * *